UNITED STATES PATENT OFFICE.

GEORGE L. SCOTT AND CYRUS McCUMBER, OF MINNEAPOLIS, MINNESOTA.

IMPROVEMENT IN RUBBER-OILS.

Specification forming part of Letters Patent No. 212,058, dated February 4, 1879; application filed October 31, 1878.

*To all whom it may concern:*

Be it known that we, GEORGE L. SCOTT and CYRUS McCUMBER, of Minneapolis, in the county of Hennepin, State of Minnesota, have invented a Rubber-Oil; and we do hereby declare that the following is a full and exact description thereof.

The nature of our invention consists in the use of india-rubber, linseed-oil, rosin, gum-shellac, gum-anime, gum-sandarac, benzole, naphtha, turpentine, sugar of lead, litharge, red lead, and gum-copal.

To prepare the rubber-oil, take four parts of india-rubber and reduce it to a liquid form by heating or dissolving, to which add six parts of linseed-oil, twenty parts of rosin, two parts each of gum-shellac, sugar of lead, litharge, and turpentine, one part each of red lead, gum-copal, gum-anime, and gum-sandarac, boiling the same until they are thoroughly dissolved and mixed together. Then add twenty parts each of naphtha and benzole. The mixture should then be thoroughly shaken and stirred until all of the several ingredients are incorporated with each other. The mixture should then be strained and left to settle, after which it can be poured or drawn off for use.

It is not necessary that the several ingredients be used in the same amount or proportion as named in the foregoing specification; but the several articles may be used in a greater or less proportion, in order to make the oil of a greater or less degree of gravity or density, according to the various uses to which it is to be applied.

Any suitable and well-known coloring material may be added to the oil or varnish.

A rubber-oil prepared and compounded according to the above specification and used as a coating or covering, possesses a durability, elasticity, and beauty of finish not contained in any other mixture or compound now in use known to us, and as the process of manufacture is very simple, no person having ordinary intelligence need experience any difficulty in preparing the same for use.

What we claim, and desire to secure by Letters Patent, is—

A rubber-oil composed of india-rubber, linseed-oil, rosin, gum-shellac, gum-anime, gum-sandarac, benzole, naphtha, turpentine, sugar of lead, litharge, red lead, and gum-copal, all substantially as herein set forth.

GEORGE L. SCOTT.
CYRUS McCUMBER.

In presence of—
ALBERT B. OVITT,
ARTHUR J. SHORNS.